United States Patent [19]

Buchholz et al.

[11] Patent Number: 5,555,266
[45] Date of Patent: Sep. 10, 1996

[54] METHOD FOR REDUCING TRANSMISSION DELAYS IN A PACKET TRANSMISSION SYSTEM

[75] Inventors: Dale R. Buchholz, Palatine; Karen E. Robbins, Lake Zurich; R. Lee Hamilton, Jr., Palatine; William K. Doss, Lake in the Hills, all of Ill.

[73] Assignee: Motorola, Inc., Schaumburg, Ill.

[21] Appl. No.: 131,358

[22] Filed: Oct. 4, 1993

[51] Int. Cl.⁶ .................................................. H04J 3/16
[52] U.S. Cl. .......................................... 370/95.1; 455/54.2
[58] Field of Search .................................... 370/95.1, 95.2, 370/95.3, 85.8, 85.7, 85.6, 58.1, 61, 79; 371/48, 57.1, 57.2, 65, 67.1; 455/33.1, 33.2, 33.4, 54.1, 67.1, 67.7, 68, 54.2, 56.2, 34.1, 34.2, 58.1; 360/825.08, 825.03, 825.15

[56] References Cited

U.S. PATENT DOCUMENTS

| | | | |
|---|---|---|---|
| 4,468,813 | 8/1984 | Burke et al. | 455/54.2 |
| 4,553,263 | 11/1985 | Smith et al. | 455/34.1 |
| 4,742,512 | 5/1988 | Akashi et al. | 370/96 |
| 4,763,320 | 8/1988 | Rudolph et al. | 370/85 |
| 4,882,730 | 11/1989 | Shinmyo | 370/95.2 |
| 4,975,952 | 12/1990 | Mabey et al. | 370/60 |
| 4,982,400 | 1/1991 | Ebersole | 370/85.15 |
| 5,008,883 | 4/1991 | Eizenhofer et al. | 370/95.1 |
| 5,050,166 | 7/1991 | Catoni et al. | 370/94.1 |
| 5,132,680 | 7/1992 | Tezuka et al. | 340/825.08 |
| 5,166,675 | 11/1992 | Amemiya et al. | 370/95.2 |
| 5,172,375 | 12/1992 | Kou | 370/95.3 |
| 5,197,125 | 5/1993 | Engel et al. | 370/95.3 |
| 5,239,545 | 8/1993 | Buchholz | 370/95.1 |
| 5,245,616 | 9/1993 | Olson | 370/60 |
| 5,337,313 | 8/1994 | Bachholz et al. | 370/96.1 |
| 5,345,596 | 9/1994 | Buchenhorner et al. | 455/33.1 |

Primary Examiner—Wellington Chin
Assistant Examiner—Huy D. Vu
Attorney, Agent, or Firm—Val Jean Hillman; Kevin A. Buford

[57] ABSTRACT

A packet transmission system (100) with reduced transmission delays includes a communications controller (110) and a plurality of remote requesting units (112) requesting packet transmission services. Each remote unit (112) sequentially stores transmitted access requests (302) in a memory queue (500) and awaits a resource grant (306) from the communications controller (110). Upon receipt of a granted resource the remote unit (112) will apply the granted resource to the oldest request (502) stored in the queue (500) in order to transmit data (310) to the communications controller (110). A separate and distinct aspect of the transmission system (100) resides within the communications controller (110). In response to the receipt of a data packet (310) from a remote unit (112), the communications controller (110) identifies missing data within the data packet transmission, determines whether communication resources are available to support retransmission of the missing data, and if so, transmits a response to the requesting remote unit identifying the missing data and simultaneously granting sufficient resources for retransmission of the missing data.

17 Claims, 10 Drawing Sheets

| ORIGINAL REQUEST OPCODE | SOURCE LUID | NUMBER REQUESTS | REQUEST 1 ID | REQUEST 1 NUMBER OF FRAGMENTS | REQUEST 2 ID | REQUEST 2 NUMBER OF FRAGMENTS | ... | REQUEST ID | REQUEST NUMBER OF FRAGMENTS |
|---|---|---|---|---|---|---|---|---|---|
| 1002 | 1004 | 1006 | 1008 | 1010 | | | | | |

FIG.11
1100

| RETRANSMIT REQUEST OPCODE | SOURCE LUID | PACKET ID | SEQUENCE NUMBER | NUMBER OF FRAGMENTS |
|---|---|---|---|---|
| 1102 | 1104 | 1106 | 1108 | 1110 |

FIG.12
1200

| ORIGINAL GRANT OPCODE | SOURCE LUID | REQUEST ID | NUMBER OF FRAGMENTS | START SLOT | NUMBER OF SLOTS |
|---|---|---|---|---|---|
| 1202 | 1204 | 1206 | 1208 | 1210 | 1212 |

FIG. 13
1300

| 1302 | 1304 | 1306 | 1308 | 1310 | 1312 | 1314 |
|---|---|---|---|---|---|---|
| RETRANSMIT GRANT OPCODE | SOURCE LUID | PACKET ID | SEQUENCE NUMBER | NUMBER OF FRAGMENTS | START SLOT | NUMBER OF SLOTS |

FIG. 14
1400

| 1402 | 1404 | 1406 | 1408 | 1410 | 1412 | 1414 | 1416 |
|---|---|---|---|---|---|---|---|
| ACK/NAK OPCODE | SOURCE LUID | PACKET ID | SEQUENCE NUMBER | NUMBER OF FRAGMENTS | START SLOT | NUMBER OF SLOTS | FRAGMENT BITMAP |

METHOD FOR REDUCING TRANSMISSION DELAYS IN A PACKET TRANSMISSION SYSTEM

RELATED INVENTION

The present invention is related to U.S. patent application Ser. No. 08/030,957, filed Mar. 12, 1993 and assigned to the assignee of the present invention.

FIELD OF THE INVENTION

This invention is directed to a packet transmission system. In particular, this invention relates to a method for improving throughput by reducing transmission delays in a packet transmission system.

BACKGROUND OF THE INVENTION

Packet transmission service has been in use for some time and has traditionally been employed within communication systems such as wireless and wireline voice and/or data communications. Packet transmission service has also been used in association with digital communication systems which permit the efficient allocation of system resources via any of the well known access schemes, such as, for example, Time Division Multiple Access (TDMA), Frequency Division Multiple Access (FDMA), Code Division Multiple Access (CDMA) or any combination thereof. As will be appreciated, system resources may comprise radio frequency (RF) spectrum divided into communication channels to facilitate the transmission of user information.

In a packet transmission system, there are several access procedures a requesting unit can initiate when attempting to obtain and utilize system resources. These access procedures inform the system which type of operation a requesting unit is attempting to perform. Such operations include but are not limited to, call origination, location reporting, registration and page response.

The typical access procedure may be summarized as follows. A requesting unit transmits a system access request (request) over a request channel to a communications controller, starts a retry timer, and awaits a bandwidth grant message from the controller, informing the unit when and which channel is available for use to commence data tranmission. If the communications controller fails to respond to the request before the retry timer expires, the requesting unit will reissue the request (duplicate request). This procedure will continue until the requesting unit either receives a valid assignment of a resource (grant), reaches a maximum number of retries, or a packet lifetime timer expires, informing the requesting unit to cease.

Each request typically seeks from the communications controller sufficient communication resources to service a single packet of requesting unit information. As is known, a packet may require fragmentation (separation into a number of smaller portions) prior to being communicated over a relatively narrow bandwidth communication channel such as an RF communications channel. When packet fragmentation is employed, each access request will request those communication resources necessary to transmit all fragments associated with the to be delivered packet.

In an RF TDMA communication system, several requests may be received by the controller per TDMA frame. Typically these requests are sequentially stored (queued) in controller memory until TDMA resources (time slots) available to support transmission of the associated data packet fragments are allocated by the controller and communicated to a remote requesting device. For identification purposes, each request contains identification information which permits the controller to distinguish one remote unit's access requests from those of another. Requests, however, do not always arrive at the controller in the order as transmitted by the remote requesting device. This is due in part to the unpredictable nature of RF communication channels which are extremely sensitive to anomalies such as rayleigh fading, multipath and/or co-channel interference and other phenomenon which frequently result in, the inability to properly transmit and receive packetized information.

To improve information delivery reliability, retry timers may be employed to assure that lost corrupted or otherwise unintelligible transmissions are retransmitted in a timely fashion. While this methodology operates to improve the delivery of requesting unit requests, it is nonetheless susceptible to lengthy transmission delays. For example, when the controller receives out-of-order requests from a requesting unit, it will proceed to grant resources for those requests in the order as received. In return, the requesting device will transmit its data packet fragments to the controller utilizing the order in which grants are received from the controller. In those instances where the destination application can handle out-of-order fragments, the controller will communicate the data to the destination application with minimal delay. A problem arises, however, when the destination application can not handle out-of order fragments (i.e., data). In such instances, the out-of-order data must be stored until all fragments associated with the original data packet have been received and assembled in the proper order. Then and only then may the controller communicate the data to the destination application. As will be appreciated, the time required (delay) for out-of-order data packet fragments to be transmitted to the controller and reassembled prior to delivery presents a severe limitation upon overall system throughput.

It would be extremely advantageous, therefore to provide an improved time-out retransmit methodology of data packet transmission which decreased the delays associated with receipt of out-of-order data packet transmissions in a packet transmission communication system.

BRIEF DESCRIPTION OF THE DRAWINGS

FIG. 10 depicts the structure of an access request message as sent from user module to a control module in accordance with the present invention;

FIG. 11 depicts the structure of a retransmit request message as sent from a user module to a control module in accordance with the present invention;

FIG. 12 depicts the structure of an grant message as sent from a control module to a user module in accordance with the present invention;

FIG. 13 depicts the structure of a retransmit grant message as sent from a control module to a user module in accordance with the present invention; and FIG. 14 depicts the structure of an ack/nak message as sent from a control module to a user module in accordance with the present invention.

SUMMARY OF THE INVENTION

Briefly described, the present invention is a method for reducing transmission delays in a packet transmission system wherein a plurality of remote units request service from a communications controller by transmitting access requests to said communications controller. Each remote unit comprises apparatus structure and method steps for sequentially storing the transmitted access requests in memory and awaiting a resource grant from the communications controller. Upon receipt of a granted resource a remote unit will apply the granted resource to the oldest request stored in memory in order to transmit data to the communications controller.

Another separate and distinct aspect of the present invention resides within the communications controller. In response to the receipt of a data packet transmission from a requesting remote unit, the communications controller comprises apparatus structure and method steps for: identifying missing data within the data packet transmission, determining whether communication resources are available to support retransmission of the missing data, and if so, transmitting a response to the requesting remote unit identifying the missing data and simultaneously granting sufficient resources for retransmission of the missing data.

DETAILED DESCRIPTION OF A PREFERRED EMBODIMENT

One aspect of the present invention is enabling remote requesting unit's within a packet transmission system to apply communication resources as granted by a communications controller to the oldest outstanding request stored in requesting unit memory. This adaptation will protect the packet transmission system from those delays associated with lost or unintelligible access requests at the communications controller. By applying the granted resource to the oldest request in memory, the present invention operates to reduce the average time required to service stored requests.

Another separate and distinct aspect of the present invention which operates to reduce transmission delays and therefore improve overall system throughput is enabling the communications controller, upon receipt of data packet transmissions from a remote requesting unit to identify missing data within the data packet transmission, determine whether communication resources are available to support retransmission of the missing data and if so, transmit a response to the requesting remote unit identifying the missing data and simultaneously granting sufficient resources for retransmission of the missing data. This adaptation will protect the packet transmission system from those delays typically associated with the remote unit issuing additional access requests (i.e., issuing access requests requesting communication resource to transmit data the communications controller has just identified as missing).

Figure 1:
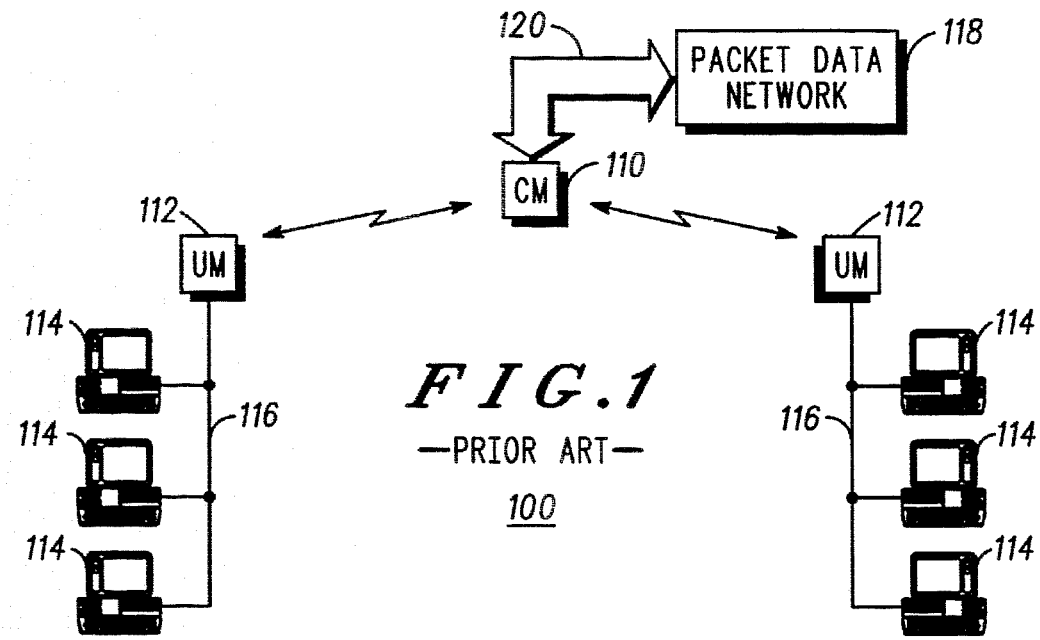
FIG. 1 is a block diagram of an RF packet transmission system as is known in the art.

The present invention has application within the field of wireless and wireline packet transmission systems. FIG. 1 illustrates an RF packet transmission system 100 comprising a wireless local area network (LAN) in which control module (CM) 110 utilizes RF communications to communicate with a plurality of user modules (UM) 112, Each UM 112 is connected to one or more user devices 114 such as a terminal, personal computer or other information input/ output device. The CM 110 is connected to packet data network 118 by data channel 120.

CM 110 controls communications within the illustrated network and passes information from data network 118 to User devices 114 via an associated UM 112. CM 110 also controls local communications by receiving information from one UM 112 and relaying the information to a different UM 112. Data network 118 may consist of an Ethernet network, a Token Ring network, or any of the other of the well known data networks. Information passed between CM 110 and UMs 112 is in the form of packets as is known in the art.

Figure 2:
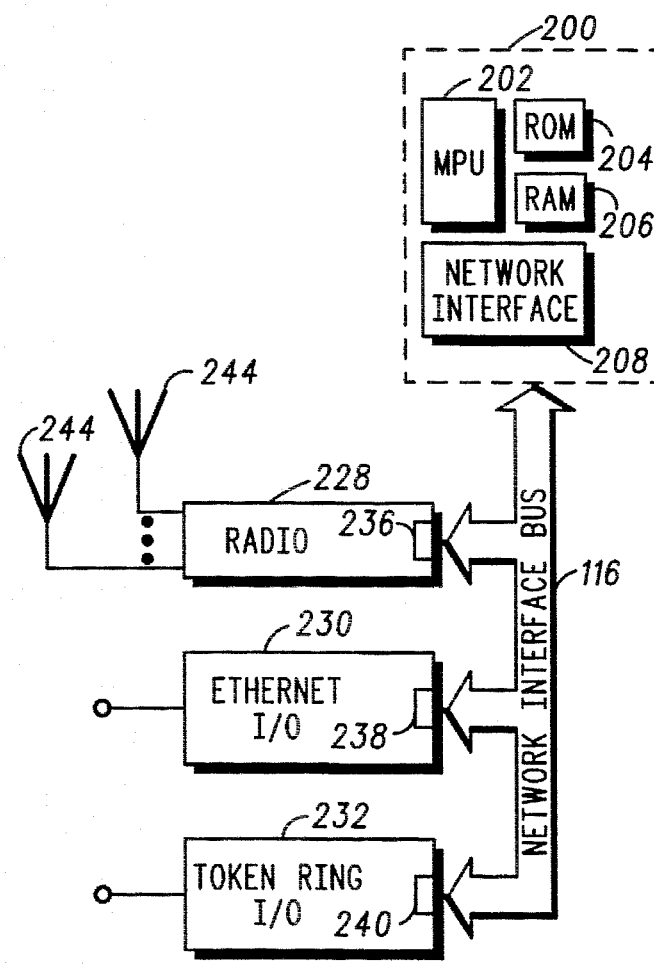
FIG. 2 is a block diagram of a user module and a control module as shown in FIG. 1.

FIG. 2 is a block diagram illustrating a user module 112 as shown in FIG. 1 and known in the art. A controller 200 includes a microprocessor 202, With associated read only memory 204, random access memory 206 and a network interface 208. The network interface 208 consists of appropriate registers and line drivers for communication with various peripheral devices.

A plurality of such devices including two-way radio 228, an Ethernet I/O device 230, and a Token Ring I/O device 232 are shown connected to UM 112 via bus 116. Each peripheral 228–232 contains a bus interface 236, 238, and 240, respectively. These interfaces provide the necessary registers and line drivers for communicating on bus 116 and will also include an MPU, RAM, and ROM if these resources are not available in the integrated devices.

The radio 228 Which comprises a transmitter and a receiver (not shown), also includes one or more antennas 244 for RF communications with CM 110 as shown in FIG. 1. The other illustrated peripherals, such as, for example, Ethernet I/O device 230 and Token Ring I/O device 232 are merely representative that virtually any type of packetized information can be coupled by means of an appropriate input/output device to UM 112. CM employs the hardware configuration as depicted in FIG. 2.

Figure 3:
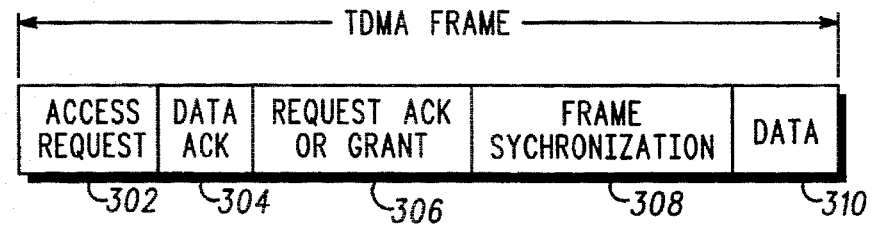
FIG. 3 depicts the TDMA frame structure utilized by RF packet transmission system of FIG. 1.

FIG. 3 depicts the TDMA frame structure utilized by the RF packet transmission system 100 of FIG. 1. As shown the frame structure 300 comprises Access Request field 302, Data_Ack field 304, Request_Ack or Grant field 306, Frame Synchronization field 1308, and Data field 310. Each TDMA frame in accordance with the present invention is 2 msec in length.

Access Request field 302 comprises a number of TDMA time slots, used by UMs 112 to send requests to CM 110 for access to data time slots within the Data fields 310. In accordance with the preferred embodiment, there are twelve (12) time slots within Access Request field 302. The allocation of these communication resources may vary depending upon the particular application.

Data_Ack field 304 comprises a number of TDMA time slots used by both CM 110 and UMs 112 to send an acknowledgement (Data_Ack) for data packets received in the previous TDMA frame. In accordance with the preferred embodiment there are four (4) of theses time slots available. Two (2) are allocated for UM to CM transmissions, the remaining two (2) are dedicated for CM to UM transmissions.

Request_Ack/Grant field 306 comprises two (2) TDMA time slots used by CM 110 to send either a request acknowledgement (Request_Ack) or a bandwidth grant indication to the UMs 112. Such a communications resource grant: directs a UM 112 to utilize specific ones of the data time slots in Data field 310 for the transmission of data. A Request_Ack directs a UM 112 that its request has been received, that communication resources are not currently available and to therefore take alternate action, such as reset its retry interval, until a communications resource becomes available. As such, the resources reserved to the Request_Ack/Grant field 306 have a dual function.

Frame Synchronization field 308 comprises three (3) TDMA time slots used by the CM 110 to broadcast frame synchronization information to all UMs 112 within the CM 110 zone of coverage. UMs 112 use this information to synchronize their TDMA frames with those of CM 110 and to evaluate the signal quality of the communications paths between themselves and CM 110.

Data field 310 comprises a number of TDMA time slots used by both the CM 110 and the UMs 112 to send data. In accordance with the preferred embodiment, there are four (4) such time slots available per TDMA frame. It will be appreciated by those skilled in the art that these 4 time slots can be allocated in a variety of ways depending upon the particular application employed. It will also be appreciated that the order in which the above fields appear in TDMA frame 300, as well as the number of time slots per field, may vary without departing from the spirit of the present invention.

Figure 4:
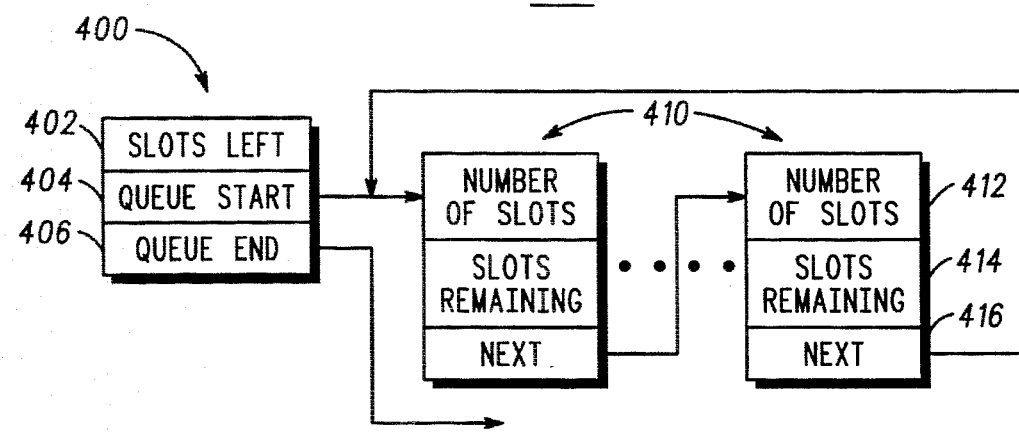
FIG. 4 depicts the structure of a Frame Control Block in accordance with the present invention.

CM 110 maintains a RAM 206 data structure shown in FIG. 4 and referred to as a Frame Control Block (FCB). FCB 400 permits CM 110 to manage the allocation of the above mentioned TDMA communication resources on a frame-by-frame basis. As depicted, FCB 400 may consist of the following fields of information; Slots_Left field 402, Queue_Start field 404 and Queue_End field 406. Slots_Left field 402 contains information on how many data time slots are available for allocation in a current frame. Queue_Start and Queue_End fields 404 and 406 point to respective queue control structures 410 within a circular linked list in RAM 206 of FIG. 2.

Queue control structures 410 contain the information necessary to schedule TDMA frame communication resources in response to the receipt of an access request. As depicted, a queue control structure 410 may consist of the following fields of information; Num_Slots field 412, Slots_Remaining field 414 and Next field 416. Num_Slots field 412 contains the number of data time slots in the current frame which have been allocated to the current access request. Slots_Remaining field 414 contains the number of data time slots required in the next frame to complete servicing of the current request. Next field 416 contains an index to the next queue control structure 410 in the linked list.

Queue_Start field 404 points to a first queue control structure 410 comprising information for scheduling resources for transmission of data. Queue_End field 406 points to the first empty queue control structure 410 available for maintaining new access request scheduling information. If the Queue_Start and Queue_End fields point to the same location, the queue control structure is empty.

In accordance with the present invention, each received access request is mapped into a corresponding queue control structure 410 by the controller 200 of FIG. 2. Of note, the communication system of the present invention may handle two separate and distinct types of access requests; original access requests and retransmit access requests, hereinafter referred to as retransmit requests. Original access requests are those requests transmitted by UMs 112 when seeking communication resources from CM 110 for the transmission of a new data packet for which no data packet fragments have yet been transmitted. Retransmit requests are those access requests originated by either UM 112 or CM 110 when seeking communication resources for the retransmission of data packet fragments which were previously transmitted by UM 112. One aspect of the present invention is that retransmit requests can be originated by either a UM 112 or CM 110.

In accordance with the present invention, CM 110 maintains separate access request queues for original access requests and retransmit requests. In accordance with another aspect of the present invention, CM 110 services all retransmit requests before servicing original access requests. In this fashion, communication resources are allocated first to those access requests in the retransmit queue, thereby giving priority to those packets which have been in the system for the greatest amount of time.

Figure 5:
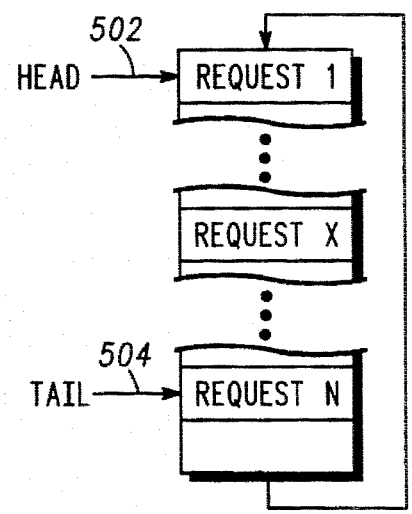
FIG. 5 depicts the structure of a control module multiple request queue in accordance with the present invention.

FIG. 5 depicts the structure of an access request queue 500 in accordance with the present invention. The structure of access request queue 500 is identical for original access requests and retransmit requests. During operation, the first access request or retransmit request received by CM 110 is stored in a queue 500 in a first-in-first-out (FIFO) fashion at a location indexed by head pointer 502. Additional requests, as received, are store in queue 500 at successive memory locations indicated by tail pointer 504. If head pointer 502 and tail pointer 504 both index the same queue location, the queue is empty.

Figure 6:
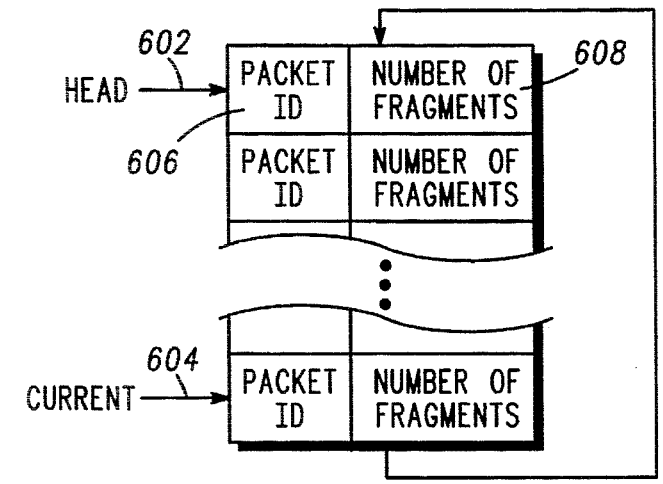
FIG. 6 depicts the structure of a user module grant management queue in accordance with the present invention.

In accordance with the present invention, information regarding each original access request is sequentially stored in RAM 206 at UM 112. FIG. 6 depicts the structure of a grant management queue (GMQ) 600 which is used to store this information at the UM 112. GMQ 600 is typically utilized by a UM 112 in order to assure that original access requests are serviced in the order that they were transmitted. During normal operation, information regarding a first access request sent to CM 11D is stored in an entry of GMQ 600 which is indexed by a head pointer 602. Information regarding each successive access request is stored in DMQ 600 at successive memory locations indicated by the current pointer 604. If head pointer 602 and current pointer 604 both index the same location in GMQ 600, the queue is assumed empty.

As depicted, each entry in GMQ 600 may consist of the following fields of information; the packet_id field 606 and the num_frags field 608. The packet_id field 606 is a tag which uniquely identifies a data packet the access request in question is associated with. The num_frags field 608 identifies a number of data time slots (310) being requested for use in transmitting the data packet to CM 110.

Figure 7A:
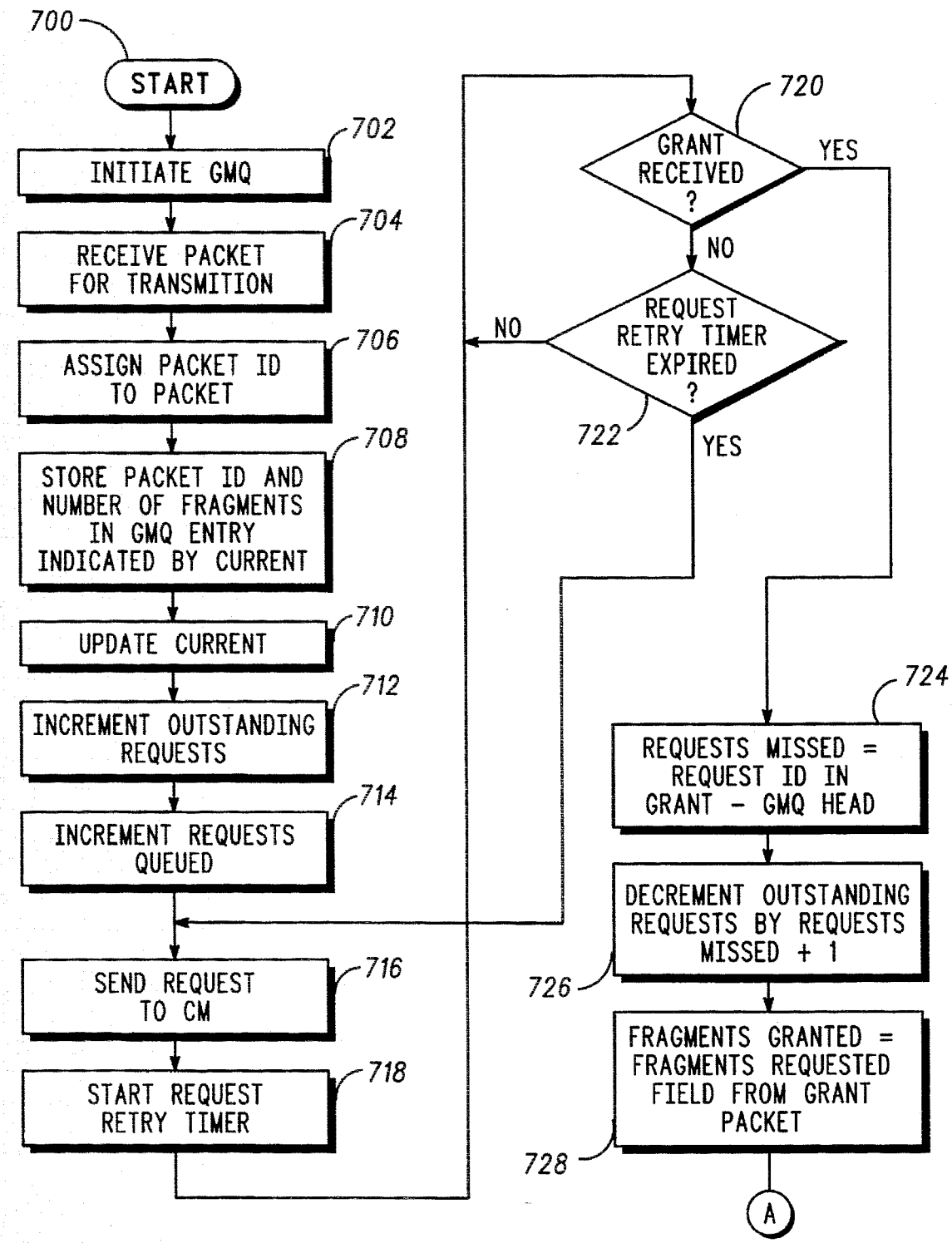
FIG. 7 is a flow chart diagram of the steps performed by the user module of FIG. 1 to reduce transmission delays in a packet transmission system in accordance with the present invention.
Figure 7B:
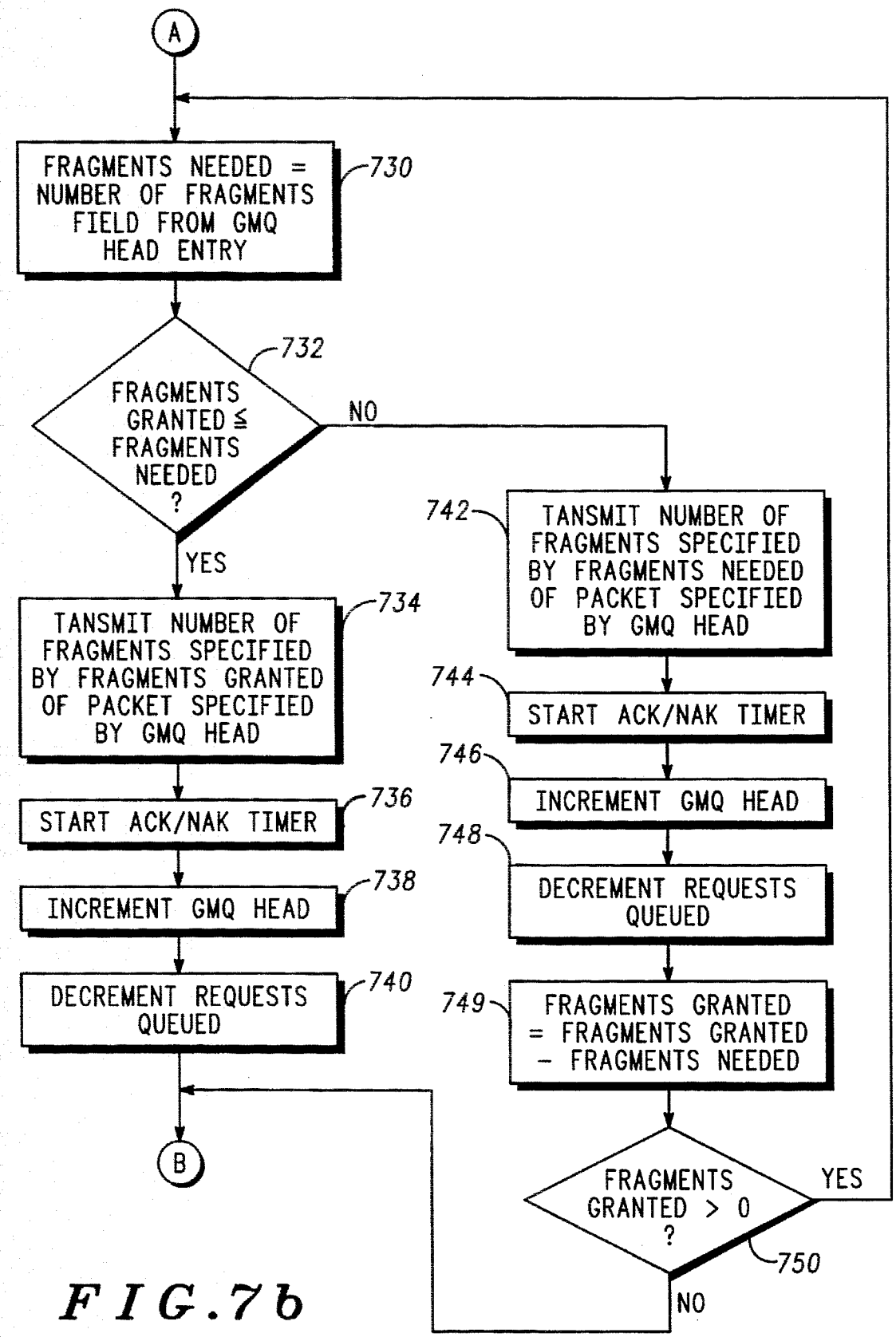
Figure 7C:
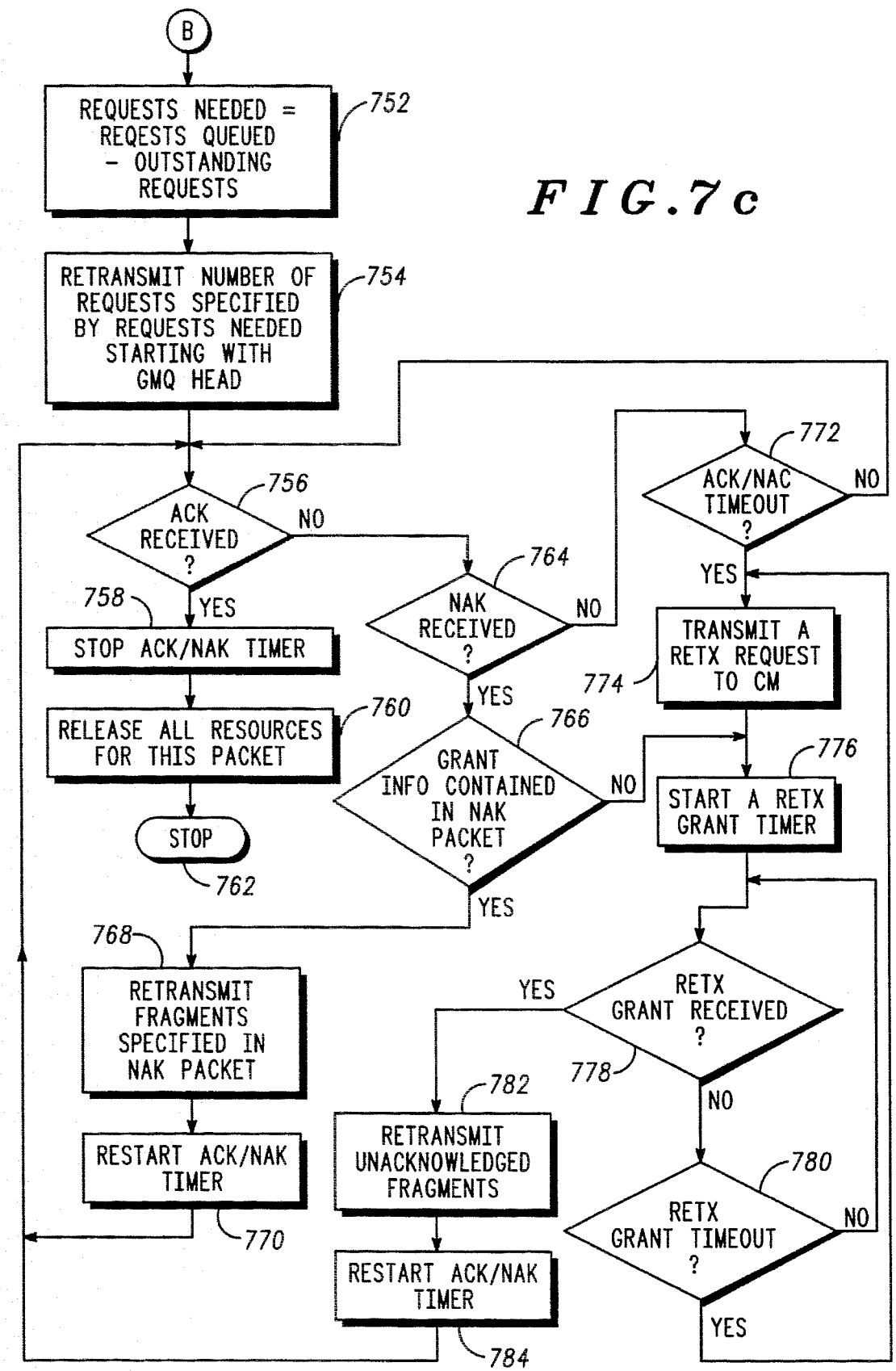

FIG. 7 is a flow chart diagram of the steps performed by the controller 200 of UM 112 under the direction of operating system instructions stored in ROM 204 to reduce transmission delays in the packet transmission system of FIG. 1. Commencing with start block 700, flow proceeds to block 702 where the controller initializes the GMQ 600 of FIG. 6 by setting both the head pointer 602 and the current pointer 604 to index the first entry in the GMQ 600. In addition RAM 206 variables: outstanding_requests, requests_missed, requests_needed, frags_granted, frags_needed and requests_queued are set to zero. At block 704, a data packet arrives at UM 112 from a user devices 114 via bus 116 for transmission to CM 110. Thus, at block 706, controller 200 assigns a unique Packet_id to the data packet. According to the present invention, the Packet_id is a number from 0 to 15. While UM 112 will reuse these numbers, only one data packet can maintain a given packet_id value at any one time. Accordingly, UM 112 can concurrently work on transmitting 16 separate data packets to CM 110 at a time.

At block 708, controller 200 stores, under the direction of current pointer 604 of FIG. 6, the packet_id determined at block 706 and the number of data fragments comprising that data packet in the packet_id field 606 and num_frags field 608 of GMQ 600. At block 710, current pointer 604 is updated to index the next unused entry in GMQ 600.

From block 710, flow proceeds to block 712, where RAM 206 variable outstanding_requests is incremented. The variable outstanding_requests indicates the number of requests UM 112 has sent to CM 110 which have not yet been responded to. At block 714 another RAM 206 variable, requests_queued, is incremented requests_queued indicates a number of GMQ 600 entries which contain information about user data packets which UM 112 is now attempting to transmit to CM 110.

From block 714, flow proceeds to block 716, where an access request is transmitted to CM 110 requesting communications resources to support transmission of received data packet. This access request includes a number of data transmission resources (data time slots 310) UM 112 needs to send the data packet, as well as data packet identification information. In particular the index into GMQ 600 where the request is stored is transmitted to CM 110 where it is tracked as a variable Request_id. At block 718, a retry timer is started. If the timer expires before the CM 110 responds to the request, the access request will be retransmitted. Thus, at decision block 720, a check is performed to determine whether a grant message has been received from CM 110. Assuming it has not, a check is performed at decision block 722 to determine if the retry timer has expired.

Assuming it has not, flow branches back to decision block 720 where the process continues until a grant is received or the retry timer expires.

Assuming the retry timer expired prior to receipt of a grant message, flow branches back to block 716 where the access request is retransmitted to CM 110. Assuming a grant message is received prior to expiration of the retry timer, flow proceeds to block 724 where RAM 206 variable, requests_missed, is set as the distance between the entry in the GMQ indexed by the head pointer and the entry in the GMQ indexed by the request_id contained in the grant message 1200 of FIG. 12. When the request_id is identical to the head pointer 602 of GMQ 600, the grant message is intended for the oldest access request in the GMQ, otherwise it is not. Since CM 110 services requests in a First-In-First-Out (FIFO) manner, the distance between the entry in the GMQ indexed by the head pointer and the entry in the GMQ indexed by the request_id indicates a number of access requests which have not serviced by CM 110. At block 726, RAM 206 variable, outstanding_requests is decremented by a value equal to the value of requests_missed (as determined at block 724)+1. This indicates that the request corresponding to the received grant message and all the requests which were determined to have been lost in block 726 are no longer considered outstanding.

In accordance with the present invention, UM 112 will always use a received grant message to service the oldest access requests in GMQ 600 first. The received grant message will, therefore, be used to transmit data fragments of the packet associated with the request indexed by head pointer 602 of FIG. 6, regardless of whether the grant message was intended for that packet or not. Unfortunately, the number of data transmission resources allocated by the grant message may or may not correspond to the resources needed to transmit the oldest packet. It is therefore necessary to determine whether the granted communication resources are sufficient to service the oldest access request. In this effort, at block 728, a number of data communication resources is determined by reading a number fragments field 1208 from the received grant message as depicted and described herein below in association with FIG. 12. At block 730 the number of communication resources necessary to transmit the oldest packet is determined by examining the num_frags field 608 in the GMQ 600 entry indexed by head pointer 602. At decision block 732, a check is made to determine whether the number of resources granted is less than or equal to the number of resources needed to transmit the oldest packet. In this fashion UM 112 is able to determines whether the granted communication resources are sufficient to service the oldest access request in memory.

Assuming the number of granted resources is less than or equal to the number required, flow proceeds to block 734 where all granted resources are used to transmit some or all data fragments of the oldest packet as identified by the GMQ 600 entry indexed by held pointer 602. If the number of granted resources exactly matches the number of resources specified in the num_frags field 608 of the oldest access request, all packet fragments associated therewith may be transmitted. If the number of granted resources is less than the number specified in the num_frags field 608 of the oldest access request, UM 112 will transmit a number of fragments as specified by the number fragments field 1208 of the grant message 1200 of FIG. 12. In accordance, only part of the packet will be transmitted. The remaining communication resources necessary to complete transmission of the packet will be granted at a later time as described herein below in more detail.

From block 734, flow proceeds to block 736 where a timeout timer is started for the transmitted data packet. If the timeout timer expires before an acknowledgment message (ack) or a negative acknowledgment message(nak) is received from CM 110, the UM 112 will transmit a retransmit request to CM 110 at block 772. In the interim, at block 738, the access request information corresponding to the packet fragments just serviced by the granted communications resources are deleted from GMQ 600 by incrementing head pointer 602 to index a next oldest GMQ 600 entry access request) in memory. At block 740, RAM 206 variable requests_queued is decremented to indicate that an entry has been deleted from GMQ 600.

Assuming, at decision block 732, the number of granted resources is determined to be larger than the number of resources required to service the oldest access request in the GMQ, flow proceed from block 732 to block 742, where a number of data packet fragments, as specified in the num_frags field of the oldest access request in GMQ 600, are transmitted to CM 110. From block 742, flow proceeds to block 744 where a timeout timer is started for the transmitted data packet. If the timeout timer expires before CM 110 returns an ack/nak message to UM 112 regarding said data packet, a retransmission request will be sent to the CM 110 at block 772. In the interim, at block 746, the access request information corresponding to the packet just serviced by the granted communications resources (the oldest access request) is deleted from GMQ 600 by incrementing head pointer 602 to index a next oldest GMQ 600 entry (access request) in memory. At block 748, RAM 206 variable requests_queued is decremented to indicate that an entry has been deleted from GMQ 600. At block 749, the value of RAM 206 variable frags_granted is decremented by the value of RAM 206 variable frags_needed to indicate that part of the granted communications resources have been used. At decision block 750, a check is made to determine if RAM 206 variable frags_granted is greater than 0, indicating whether there are still granted resources available which can be applied to the next oldest request in GMQ 600. Assuming frags_granted is greater than 0, flow branches back to block 730 and the next oldest access request is serviced in accordance with the method set forth herein above. Assuming frags_granted is not greater than 0, no further access requests can be serviced.

Flow then proceeds from either decision block 750 or block 740 to block 752 where a RAM 206 variable, requests_needed, is set equal to the difference between RAM 206 variables requests_queued and outstanding_requests. Requests_needed now indicates the number of original requests in memory between the next oldest request and the request the received grant was intended for, all of which have not been serviced by CM 110. At block 754, UM 112 bundles the number of communication resources indicated by RAM 206 variable requests_needed, starting with the access request indexed by head pointer 602 of FIG. 6 and ending with the access request the granted resource was originally intended for, into a single access request for transmission to CM 110. This is done to assure that the access request the grant was intended for as well as all unacknowledged access requests between the next oldest and the access request the grant was originally intended for will be serviced.

Proceeding to decision block 756, a check is made to determine whether an acknowledgment message has been received from CM 110 acknowledging receipt of the transmitted data packet fragments. Assuming an acknowledgment message has been received, flow proceeds to block 758 where the timeout timer is stopped. At block 760, all communication resources associated with the acknowledged packet are released and transmission is complete. Processing for the packet concludes at stop block 762.

Assuming, at decision block 756, that no acknowledgment message has been received from CM 110, flow proceeds to decision block 764 where a check is made to determine whether a negative acknowledgment message (nak) has been received from the CM 110. The nak message informs UM 112 that some of the data fragments were not received by the CM 110, indicates which fragments these are and therefore indicates to UM 112 a need to retransmit missing data. In addition, and further in accordance with the present invention, if the CM 110 has communications resources immediately available, the nak message may include retransmit resources. Receipt of said retransmit resources will allow UM 112 to immediately retransmit the missing data fragments instead of having to send a retransmit request to CM 110 and wait for a retransmit grant message. Assuming a nak message was received at block 764, flow proceeds to decision block 766 where a check is made to determine whether the nak message contains retransmit grant information. Assuming, it does, flow proceeds to block 768, where the data fragments identified as missing in the nak message are retransmitted to CM 110. At block 770, the timeout timer is restarted and flow returns to decision block 756 while the UM 112 waits for another ack/nak message from CM 110 indicating receipt of the retransmitted data fragments.

If the nak message at block 764 does not contain retransmit resources as determined at block 766, flow will proceed from block 764 to block 776 where a retransmit grant timer is started. Of, note, UM 112 refrains from transmitting a retransmit request to the CM 110 because the nak message provides UM 112 with an indication that CM 110 already knows that UM 112 needs retransmission resources and will send a retransmit grant as soon as possible.

Assuming, at decision block 764, that no nak message has been received, flow proceeds to decision block 772 where a check is made to determine whether the timeout timer has expired. Assuming the timeout timer has not expired, flow returns to decision block 756 where the UM 112 continues to wait for an ack or nak message from CM 110. If it is determined, however, at decision block 772, that the timeout timer has expired, flow will proceed to block 774 where a retransmit request is sent from UM 112 to CM 110. The retransmit request asks the CM for enough communication resources to retransmit all fragments of the packet which have not been acknowledged. At block 776, a retransmit grant timer is started. Thereafter, at decision block 778, a check is made to determine whether a retransmit grant has been received. Assuming it has, flow proceeds to block 782 where all data fragments of the packet which have not already been acknowledged by the CM 11C are retransmitted. At block 784 an ack/nak timer is started and flow returns to decision block 756 where UM 112 waits for another ack or nak message from CM 110.

Assuming, however, at decision block 778, that no retransmit grant message has been received, flow proceeds to decision block 780 where a check is made to determine if the retransmit grant timer has expired. Assuming it has not, flow branches back to decision block 778 where UM 112 continues to wait for a retransmit grant message from CM 110. If, on the other hand, the retransmit grant timer has expired, flow branches back to block 774 where a retransmit request is sent to CM 110 again. This process continues until UM 112 successfully transmit all fragments of the packet to CM 110 and receives an acknowledgment message from CM 110.

CM 110, under the direction and control of system operating instructions stored in ROM 204 of FIG. 2, monitors the FCB 400 of FIG. 4 to keep track of how many data time slots are available and/or allocated during a current frame. As long as there is at least one data time slot available, CM 110 will grant resources to an incoming and/or queued access request. Thus, at the start of each new frame, CM 110 reviews the FCB, removes any requests which have previously been serviced, schedules available data slots for allocation and updates the number of time slots currently allocated.

Figure 8A:
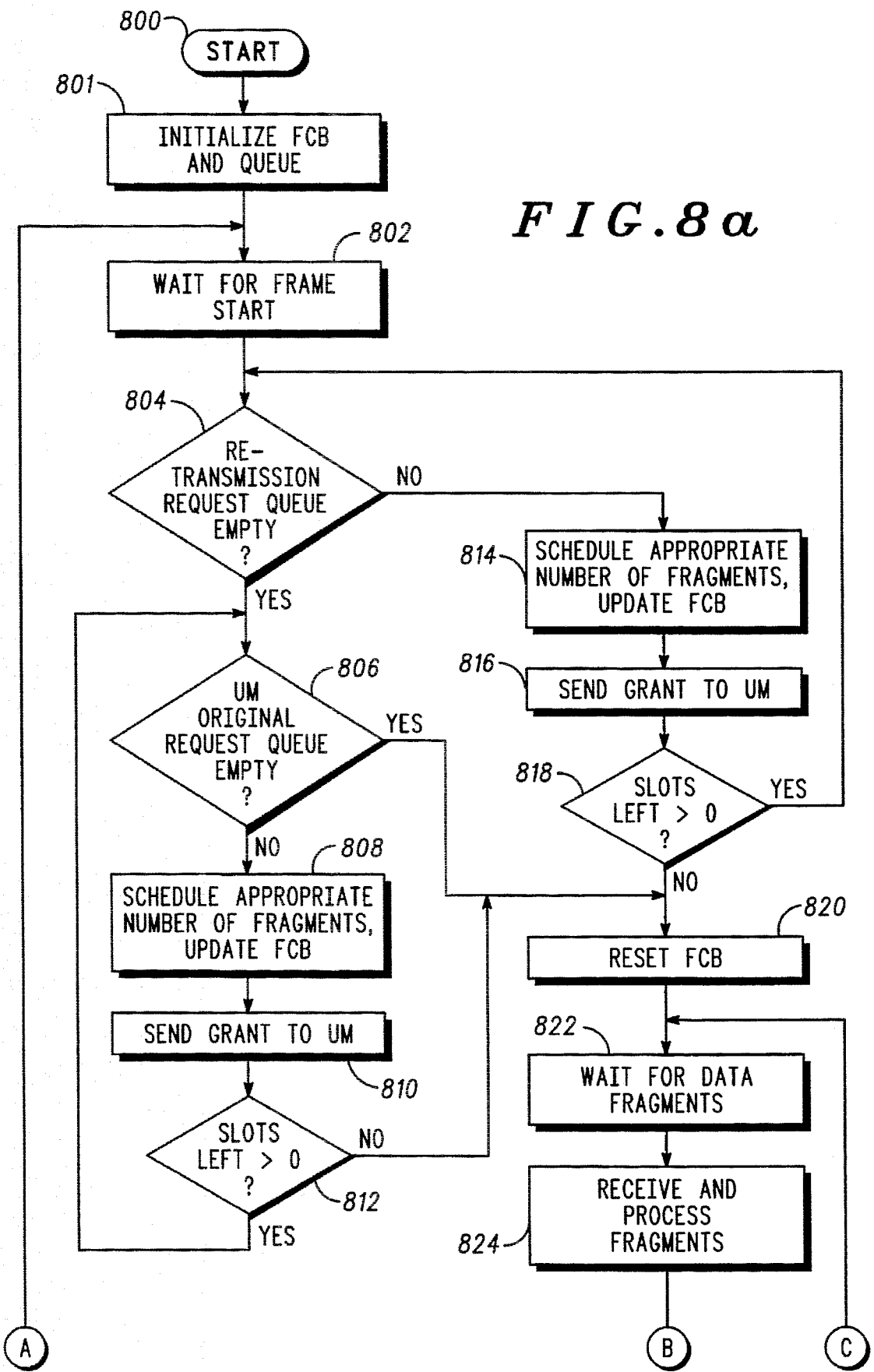
FIG. 8 is a flow diagram of the steps performed by the control module of FIG. 1 to reduce transmission delays in a packet transmission system in accordance with the present invention.
Figure 8B:
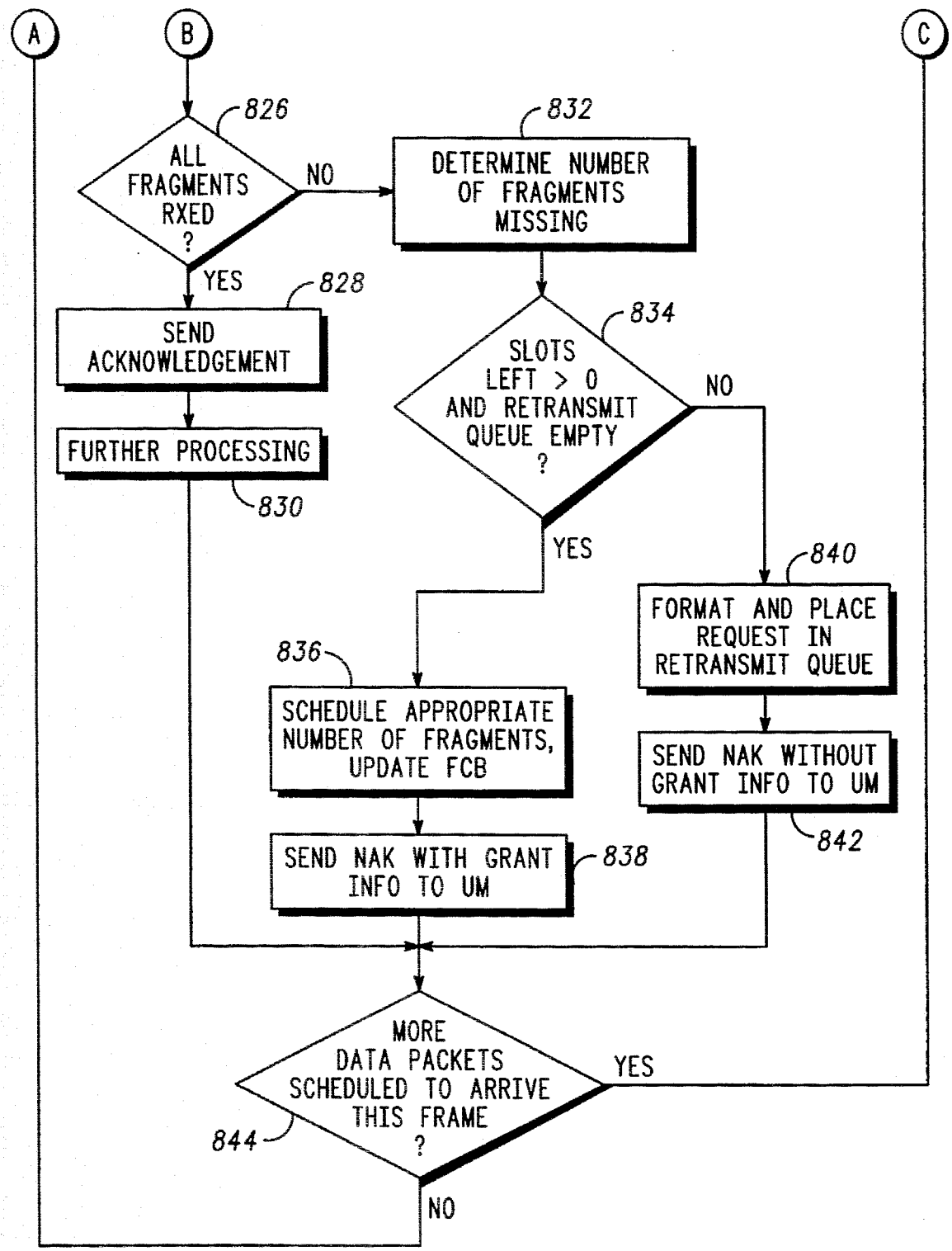

FIG. 8 is a flowchart diagram of the steps performed by the controller 200 of CM 110 in order to reduce transmission delays in the packet transmission system 100 Of FIG. 1. Commencing with start block 800, flow proceeds to block 801 where controller 200 initializes FCB 400 and queue control structures 410 as well as the original request and retransmit request queues 500. Initializing the FCB 400 and queue control structures 410 amounts to setting Slots_Left field 402 to the total number of data time slots available in each TDMA frame and setting Queue_Start and Queue_End fields 404 and 406 to index a first entry in queue control structure 410. Initializing the request queues amounts to setting Head pointer 502 and Tail pointer 504 to index the first request structure in the respective queues. At block 802, controller 200 waits for the start of the next TDMA frame. Communications resource allocation is performed at the start of each TDMA frame.

At decision block 804, a check is made to determine whether the retransmit request queue is empty. The retransmit request queue holds retransmit requests for data communication resources which a requesting UM 112 will use to retransmit fragments of a packet which have already been transmitted to, but not acknowledged by CM 110. Retransmit requests are placed in the retransmit request queue when UM 112 explicitly sends a retransmit request to CM 110 or when CM 110 itself causes a retransmit request to be placed in the retransmit queue. This typically occurs when CM 110 sends a negative acknowledgment to UM 112 that does not include retransmit grant information in the negative acknowledgment message.

Assuming the retransmit queue is not empty, flow proceeds to block 814 where controller 200 schedules the number of data communication resources indicated in the first request in the retransmit queue. The first request in the retransmit queue is indexed using head pointer 502 of FIG. 5. Scheduling data communication resources at CM 110 is described herein below in more detail in association with FIG. 9. At block 816, CM 110 sends a retransmit grant message to the requesting UM 112.

At decision block 818, a check is performed to determine if Slots_Left field 402 of the FCB 400 is greater than 0. If Slots_Left field 402 is greater than 0, there are communication resources available for allocation. Flow then branches back to decision block 804 where a check is made to determine whether the retransmit request queue is empty.

Assuming, at decision block 804, it is determined that the retransmission request queue is empty, flow will proceed to decision block 806 where a check is made to determine whether the UM original access request queue is empty. The UM access request queue holds access requests for data transmission resources which the requesting UM 112 will use to transmit data fragments of packets which have not before been transmitted to CM 110. Requests are placed in the UM access request queue when a CM 112 transmits an original access request to CM 110. Assuming the UM access request queue is not empty, flow proceeds to block 808 where the controller 200 schedules a number of data communication resources indicated in the first request in the queue. The first request in the access request queue is indexed using head pointer 502 of FIG. 5. Scheduling data communication resources at the CM 110 is described herein below in more detail in association with FIG. 9. At block 810, CM 110 transmits a grant message to the requesting UM 112.

At decision block 812 a check is made to determine if Slots_Left field 402 of FCB 400 is greater than 0. Assuming Slots_Left field 402 is greater than 0, flow branches back to decision block 806 where a check is performed to determine if the access request queue is now empty. Assuming, at decision block 812, or decision block 818, that Slots_Left field 402 is not greater than 0, or assuming at decision block 806, that the access request queue is empty, flow will proceed to block 820. At this point it is assumed that CM 110 either has no more data communication resources resources available to allocate or there are no more requests (retransmit requests or access requests) queued for service. Thus, at block 820, controller 200 will reclaim all data communication resources which were allocated for the current TDMA frame so they can be reused in the following TDMA frame. This amounts to setting Slots_Left field 402 to the difference between the total number of data transmission resources in each TDMA frame and the number of data transmission resources which were preallocated for the following TDMA frame and removing all schedule entries 410 from FCB 400 which were concluded in the current TDMA frame.

At block 822, CM 110 waits for data packet fragments to arrive which correspond to the first scheduled resources in the current TDMA frame. At block 824, CM 110 receives and processes the data packet fragments for the first scheduled packet. In accordance, at decision block 826, a check is made to determine whether all fragments of the transmitted packet have been received. Assuming all fragments of the packet have been received, flow proceeds to block 828, where CM 110 sends an acknowledgment message to the source UM 112. At block 830, the received packet fragments are assembled and passed to a destination application for further processing. If, however, it is determined at decision block 826, that some fragments of the transmitted packet have not been received, flow proceeds to block 832, where controller 200 determines how many data packet fragments have not been received and identifies the missing data packet fragments.

At decision block 834, a check is made to determine whether communication resources are available to support retransmission of the missing data. In this effort a check is made to determine whether Slots_Left field 402 is greater than 0 and if the retransmit request queue is empty. Slots_Left field 402 greater than 0 indicates that data communication resources will be available in the following TDMA frame. CM 110 will not include retransmit grant information in a negative acknowledgment message if there are any requests in the retransmit request queue. This gives priority to the oldest retransmit requests in the system.

Assuming that Slots_Left field 402 is greater than 0 and there are no retransmit requests queued in the retransmit request queue, flow proceeds to block 836 where controller 200 schedules sufficient data communication resources to allow the source UM 112 to retransmit the data packet fragments that CM 110 determined and identified as missing at block 832. In accordance, at block 838, CM 110 transmits a negative acknowledgment message to the source UM 112. This negative acknowledgment message identifies all missing data packet fragments and will also contain retransmit grant information so that UM 112 can resend the missing data packet fragments in the following TDMA frame.

Assuming, at decision block 834, that Slots_Left field 402 is not greater than 0 or that the retransmit request queue is not empty, flow will proceed to block 840. At this point it is assumed that communication resources are not currently available to support retransmission of the missing data fragments. Consequently, CM 110 will not place retransmit grant information in the negative acknowledgment message for transmission to UM 112. Notwithstanding, at block 840, controller 200 generates a retransmit request and places this request in the retransmit request queue for the source UM 112. This retransmit request will be for the number of data packet fragments identified as missing at block 832. As will be appreciated, the fact that CM generates the retransmit request obviates the need for source UM 112 to expend valuable time and communication resources requesting such resources. At block 842, CM 110 transmits a negative acknowledgment message to the source UM 112. This negative acknowledgment message identifies the data fragments which were not received by the CM 110, but it does not contain retransmit grant information. UM 112, upon receipt of this negative acknowledgment message will refrain from transmitting a retransmit request to CM 110 because UM 112 can assume that CM 110 already placed a retransmit request in the retransmit queue for the number of communication resources the CM identified as missing and in need of retransmission.

Proceeding to decision block 844, a check is made to determine whether more data fragments are scheduled to arrive in the current TDMA frame. Assuming there are more data fragments scheduled to arrive, flow branches back to block 822 where CM 110 awaits the arrival of the scheduled data fragments. Assuming no more data fragments are scheduled for arrival, flow branches back to block 802, where CM 110 awaits the start of the next TDMA frame.

Figure 9:
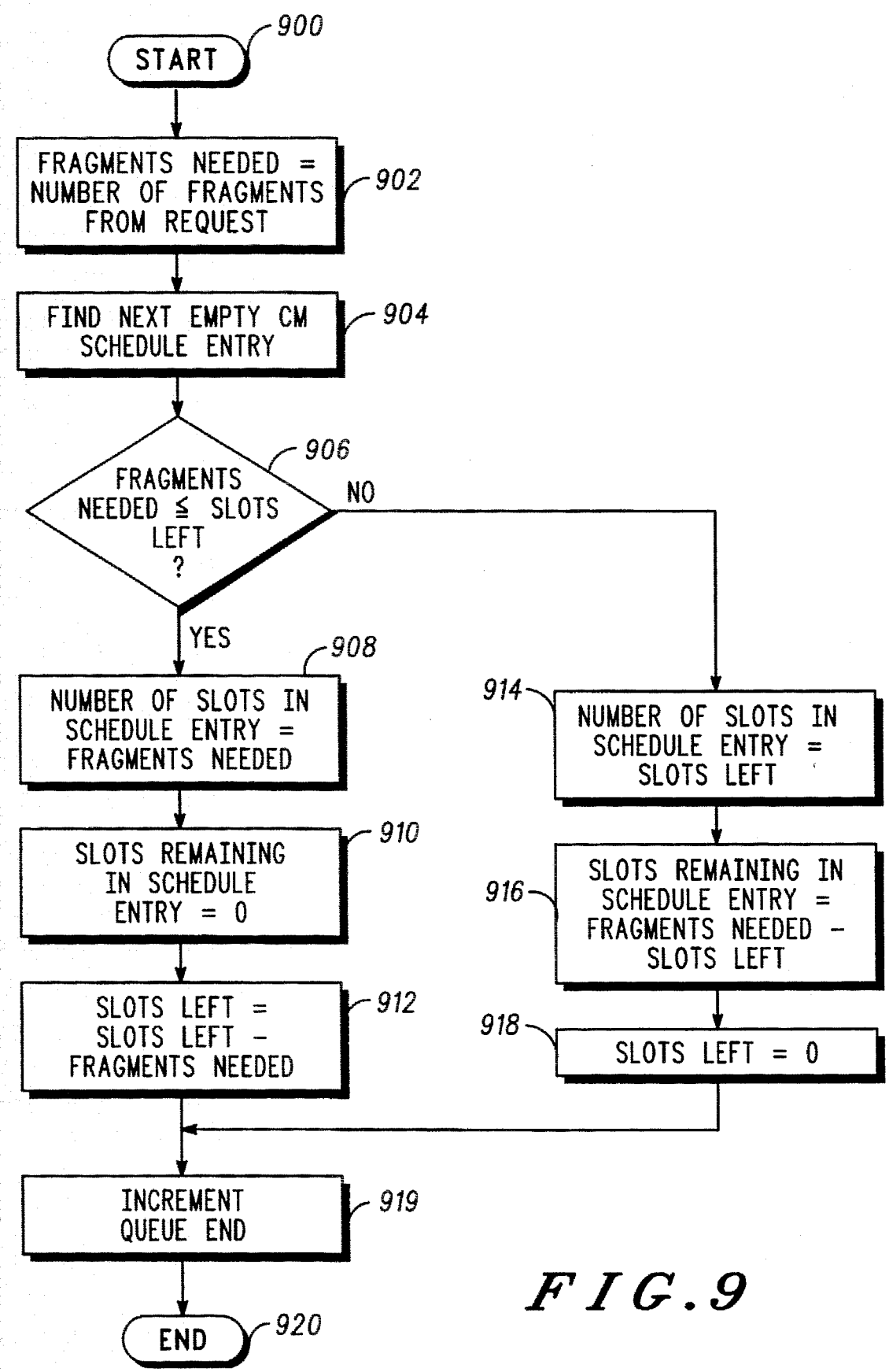
FIG. 9 is a flow diagram of the steps performed by the control module of FIG. 1 to schedule data transmission resources in accordance with the present invention.

Scheduling data communication resources at CM 110 involves monitoring and manipulating FCB 400 in order to keep track of which data slots in each TDMA frame are allocated and which are still available for allocation. FIG. 9 is a flow chart diagram of the steps performed by the controller 20C, of CM 110 in order to schedule data communication resources to service an access request from a UM 112. Commencing at start block 900, flow proceeds to block 902 where a RAM 206 variable, frags_needed is set equal to the number of fragments which is needed to serviced the request. This value is obtained from the number fragments field 1310 of the retransmit request structure as depicted in FIG. 13 or the UM original access request queue. At block 904, the next empty schedule entry 410 is found in FCB 400 by using the Queue_End field 406 to index into the list of schedule entries 410. At decision block 906, a check is made to determine whether the number of resources needed to fully service the request, determined in block 902, is less than or equal to Slots_Left field 402. Assuming frags_needed is less than or equal 420 to Slots_Left, the request can be fully serviced in the current TDMA frame and processing continues to block 908, where Num_slots field 412 of the schedule entry located in block 904 is set equal to RAM 206 variable frags_needed. At block 910, Slots_Remaining field 414 is set equal to 0, indicating that the request will be fully serviced in the current TDMA frame. At block 912, Slots_Left field 402 is decremented by the number of slots indicated in RAM 206 variable frags_needed. This removes the resources which were placed in the schedule entry from the pool of available resources.

Assuming, at decision block 906, that frags_needed is greater than Slots_Left field 402, then the request cannot be fully serviced in the current TDMA frame and flow will continue to block 914. At block 914, all remaining data slots in the current TDMA frame are allocated to the current request by setting Num_slots field 412 equal to Slots_Left field 402. At block 916, Slots_Remaining field 414 is set equal to the difference between frags_needed and Slots_Left field 402. Slots_Remaining field 414 represents the number of data slots which will be preallocated for use in the following TDMA frame in order to finish servicing this request. At block 918, Slots_Left field 402 is set equal to 0, indicating there are no more resources available for allocation in the current TDMA frame. At block 919, Queue_End field 406 is incremented to index the next unused schedule entry which is indexed using Next field 416 of the current schedule entry. Processing concludes at End block 920.

FIG. 10 depicts the structure of an access request message which is sent from a UM 112 to CM 110 in order to request data communication resources which will be used to transmit data packet fragments to CM 110. As shown, the access request message 1000 is comprised of a access request opcode field 1002, source LUID field 1004, number requests field 1006, request ID field 1008, and number fragments field 1010. The request opcode field 1002 identifies the message as an original access request to CM 110. Source LUID field 1004 identifies the source UM 112. Number requests field 1006 identifies how many original request are bundled into this message. As will be appreciated, a UM 112 can send multiple access requests in the same message. Each additional access request will consist of the following two fields only; the request ID field 1008 and the number fragments field 1010. The request ID filed 1008 indicates the index into the GMQ 600 for the request at the sending UM 112. Number fragments field 1010 indicates the number of data transmission resources needed to transmit the packet.

FIG. 11 depicts the structure of a retransmit request message which is sent from a UM 112 to the CM 110 in order to request data transmission resources which will be used by the requesting UM 112 to retransmit missing packet fragments. As depicted, the retransmit request message 1100 is comprised of a retransmit request opcode field 1102, a Source LUID field 1104, a packet id field 1106, a sequence number field 1108, and a number fragments field 1110. Retransmit request opcode field 1102 identifies the message as a retransmit request. Source LUID field 1104 identifies the sending UM 112. Packet ID field 1106 and sequence number field 1108 are used by source UM 112 to identify the packet the request was intended for when CM 110 responds with a retransmit grant message. Number fragments field 1110 identifies how many data communications resources are necessary to retransmit unacknowledged data packet fragments.

FIG. 12 depicts the structure of a grant message which is sent from CM 710 to UM 112 in order to allocate available communication resources. As shown, the grant message 1200 comprises a grant opcode field 1202, source LUID field 1204, request ID field 1206, number fragments field 1208, start slot field 1210, and number slots field 1212. The grant opcode field 202 identifies the message as an original grant. Source LUID field 1204 will contain the source LUID field 1004 from a corresponding access request. Thus, the value of source LUID field 204 should match the known LUID of the receiving UM 112. Request ID field 1206 will contain the request ID field 1008 from the corresponding access request message. UM 112 uses request ID field 1206 to index the GMQ 600 and correlate the grant message 1200 with a stored access request. Number fragment field 1208 indicates the total number of data communication resources which are being allocated by the CM 110 for this request. Start slot field 1210 indicates the first data communication time slot 310 of FIG. 3 that the UM 112 may use in the current TDMA frame. Number slots field 1212 indicates the number of data time slots 310 that UM 112 may use in the current TDMA frame. If number 1 slots field 1212 is less than number fragments field 1208, the remaining allocated resources are reserved for use by UM 112 starting with the first data time slot 310 in the following TDMA frame.

FIG. 13 depicts the structure of a retransmit grant message which is sent from CM 110 to UM 112 in response to a retransmit request message 1100. As shown, the retransmission grant message 1300 is comprised of re, transmission grant opcode field 1302, source LUID field 1304, packet ID field 1306, sequence number field 1308, number fragments field 1310, start slot field 1312, and number slots field 1314. Retransmission grant opcode field 1302 identifies the message as a retransmit grant. Source LUID field 1304 is copied from the source LUID field 1104 in the corresponding retransmission request message 1100 by the CM 110. The value of source LUID field 304 should match the known LUID of a receiving UM 112. Packet ID field 1306 and sequence number field 1308 are copied from packet ID field 1106 and sequence number field 1108, respectively, in the corresponding retransmit request message 1100. The UM 112 uses packet ID field 1306 and sequence number field 1308 to identify the packet that the retransmit grant 1300 is intended for. Number fragment field 1310 indicates the total number of data communication resources which are being allocated by the CM 110 for this request. Start slot field 1312 indicates the first data time slot 310 of FIG. 3 that UM 112 may use in the current TDMA frame. Number slots field 1314 indicates the number of data time slots 310 that UM 112 may use in the current TDMA frame. If number slots field 1314 is less than number fragments field 1310, the remaining allocated resources are reserve for use by UM 112 starting with the first data time slot 310 in the following TDMA frame.

FIG. 14 depicts the structure of an ack/nak message which is sent from CM 110 to UM 112 in response to receiving some or all fragments of a transmitted data packet. As shown, the ack/nak message 1400 comprises an ack/nak opcode field 1402, source LUID field 1404, packet ID field 1406, sequence number field 1408, number fragments field 1410, start slot field 1412, number slots field 1414, and fragment bitmap 1416. Ack/nak opcode field 1402 identifies the message as either an ack or a nak. Source LUID field 1404 contains the value copied from the data packet being acknowledged. The value of source LUID field 1404 should match the known LUID of the receiving UM 112. Packet ID field 406 and sequence number field 1408 are also copied from the received data packet. The UM 112 uses packet ID field 1406 and sequence number field 1408 to identify the packet that the ack/nak message 1400 is intended for. If the message is a nak message, as indicated by ack/nak opcode field 1402, the CM may include retransmit grant information in the nak message. Number fragment field 1410 indicates the total number of data communication resources which are being allocated for this request. If number fragments field 1410 is equal to 0, then no retransmit grant information is included. Start slot field 1412 indicates the first data time slot 310 of FIG. 3 that the UM 112 may use in the current TDMA frame for retransmitting data. Number slots field 1414 indicates the number of data time slots 310 that the UM 112 may use in the current TDMA frame. If number slots field 1414 is less than number fragments field 1410, the remaining allocated resources are reserved for use by UM 112 starting with the first data time slot 310 in the following TDMA frame. Fragment bitmap field 1416 is used to identify which data packet fragments have been received and which data packet fragments are missing.

By enabling remote requesting unit's within a packet transmission system to apply communication resources as granted by a communications controller to the oldest outstanding request stored in requesting unit memory, the present invention operates to protect the packet transmission system from those delays associated with lost or unintelligible access requests and reduce the average time required to service stored requests.

Moreover, by enabling a communications controller (CM 110), upon receipt of data packet transmissions from a remote requesting unit (UM 112) to identify missing data within the data packet transmission, determine whether system resources are available to support retransmission of the missing data and if so, transmit a response to the requesting remote unit identifying the missing data and simultaneously granting sufficient resources for retransmission of the missing data, the present invention operates to protect the packet transmission system from those delays typically associated with the remote unit issuing additional access requests, thereby reducing transmission delays and improving overall a system throughput. When no communications resources are available to support retransmission of the missing data, the communications controller automatically generates a retransmit request and enters it into the retransmit queue, thereby obviating the need for the remote unit to issue a retransmit request for these resources.

What is claimed is:

1. In a packet transmission system wherein a plurality of remote units request service from a communications controller by transmitting plural access requests to said communications controller, establishing a time within which a response to a given one of the access requests is anticipated and retransmitting said given access request upon expiration of the established time, a method for reducing transmission delays, said method comprising the steps of:

at the remote units:

storing the plural transmitted access requests sequentially in memory;

awaiting resource grants from the communications controller; and applying a resource grant next received from the communications controller to the oldest of the plural access requests stored in memory in order to transmit data packets to the communications controller.

2. The method of claim 1 further comprising the steps of:

starting a retry timer for each transmitted access request; and retransmitting the access request upon expiration of the associated retry timer.

3. The method of claim 1 further comprising the steps of:

separating the data packet transmitted to the communications controller into a plurality of data packet fragments.

4. In a packet transmission system wherein a plurality of remote units request service from a communications controller by transmitting access requests to said communications controller, establishing a time within which a response is anticipated and retransmitting said access requests upon expiration of the established time, a method for reducing transmission delays, said method comprising the steps of:

at the remote units:

storing the transmitted access requests sequentially in memory;

awaiting resource grants from the communications controller; and applying resource grants received from the communications controller to the oldest access request stored in memory in order to transmit data packets to the communications controller, wherein the step of applying resource grants received from the communications controller further comprises the steps of:

determining whether the resource grant was intended for the oldest access request in memory;

applying the resource grant to the oldest access request in memory;

deleting the oldest access request from memory;

determining a next oldest access request; and retransmitting a single access request to the communications controller requesting communication resources for all unacknowledged access requests in memory between the next oldest access request and the access request the resource grant was intended for.

5. In a packet transmission system wherein a plurality of remote units request service from a communications controller by transmitting access requests to said communications controller, establishing a time within which a response is anticipated and retransmitting said access requests upon expiration of the established time, a method for reducing transmission delays, said method comprising the steps of:

at the remote units:

storing the transmitted access requests sequentially in memory;

awaiting resource grants from the communications controller; and applying resource grants received from the communications controller to the oldest access request stored in memory in order to transmit data packets to the communications controller, wherein the step of applying the granted resource further comprises the steps of:

determining whether the granted resource is sufficient to service the oldest access request; and if so, transmitting a number of data packet fragments as specified by the oldest access request.

6. The method of claim 5 further comprising the steps of:

starting a timeout timer for each transmitted data packet fragment;

awaiting a response from the communications controller indicating receipt of data;

awaiting a response from the communications controller indicating a need to retransmit data;

upon receipt of a response indicating a need to retransmit data, refraining from transmitting a retransmit request to the communications controller requesting additional communications resources; and transmitting a retransmit request to the communications controller requesting additional communications resources upon expiration of the associated timeout timer.

7. The method of claim 6 wherein the response from the communications controller indicating a need to retransmit data further comprises a resource grant from the controller for use by the remote unit during data retransmission.

8. The method of claim 5 further comprising the steps of:

determining whether resource grants are still available after the number of resource grants necessary to transmit the oldest access request are transmitted; and applying said still available resource grants to a next oldest access request in memory.

9. In a packet transmission system wherein a plurality of remote units request service from a communications controller by transmitting access requests to said communications controller, establishing a time within which a response is anticipated and retransmitting said access requests upon expiration of the established time, a method for reducing transmission delays, said method comprising the steps of:

at the remote units:

storing the transmitted access requests sequentially in memory;

awaiting resource grants from the communications controller; and applying resource grants received from the communications controller to the oldest access request stored in memory in order to transmit data packets to the communications controller, wherein the step of applying the granted resource further comprises the steps of:

determining whether the granted resource is sufficient to service the oldest access request; and if not, transmitting a number of data packet fragments as specified in the grant.

10. The method of claim 9 further comprising the steps of:

starting a timeout timer for each transmitted data packet fragment;

awaiting a response from the communications controller indicating receipt of data;

awaiting a response from the communications controller indicating a need to retransmit data;

upon receipt of a response indicating a need to retransmit data, refraining from transmitting a retransmit request to the communications controller; and transmitting a retransmit request to the communications controller requesting additional communication resources upon expiration of the associated timeout timer.

11. In a packet transmission system wherein a plurality of remote units request service from a communications controller by transmitting access requests to said communications controller, said communications controller receiving said access requests, storing the requests in a first memory queue, allocating and communicating resource grants to the plurality of remote units and awaiting data packet transmissions from the plurality of remote units, a method for reducing transmission delays when lost, corrupted or otherwise unintelligible data packet transmissions are received by the communications controller comprising the steps of:

at the communications controller, upon receipt of data packet transmissions from any one of said plurality of remote units:

identifying lost, corrupted or otherwise unintelligible data within the data packet transmissions from any one of said plurality of remote units;

determining whether communication resources are available to support retransmission of the lost, corrupted or otherwise unintelligible data; and if so, transmitting a response to any one of said plurality of remote units exhibiting lost, corrupted or otherwise unintelligible data transmissions, said response identifying the lost, corrupted or otherwise unintelligible data data and simultaneously granting sufficient communications resources to any one of said plurality of remote units exhibiting lost, corrupted or otherwise unintelligible data transmissions for retransmission of the to lost, corrupted or otherwise unintelligible data.

12. The method of claim 11 further comprising the steps when communication resources are unavailable of:

transmitting a response to any one of said plurality of remote units exhibiting lost, corrupted or otherwise unintelligible data transmissions, said response identifying the missing data;

generating a retransmit request for the lost, corrupted or otherwise unintelligible data;

storing the retransmit request in a second memory queue; and when communication resources are available, allocating said communication resources to service the retransmit requests stored in the second memory queue.

13. The method of claim 11 wherein the step of determining whether communication resources are available further comprises the step of:

scheduling available communication resources to service retransmit requests stored in the second memory queue prior to servicing the access requests stored in the first memory queue.

14. In a TDMA packet transmission system wherein a plurality of remote requesting units request communication resources from a communications controller within said system by transmitting access requests to said communications controller, a remote unit for reducing transmission delays when lost, corrupted or otherwise unintelligible data is received by the communications controller, said remote unit comprising:

a transmitter for transmitting access requests to the communications controller requesting communication resources to facilitate transmission of data packets to the communications controller;

memory, coupled to the transmitter, for sequentially storing the access requests;

a receiver for receiving a signal from the communications controller indicating allocation of a resource grant;

a remote unit controller, coupled to the receiver and the transmitter for applying the resource grant received from the communications controller to the oldest access request stored in memory in order to transmit a data packet to the communications controller;

upon said data packet transmission, said remote unit controller awaiting a response from the communications controller indicating a need to retransmit at least some of the data; and upon receipt of said response, said remote unit controller inhibiting the transmitter from transmitting an access request to the communications controller requesting additional communication resources.

15. In a TDMA packet transmission system wherein a plurality of remote units request communication resources from a communications controller by transmitting access requests to said communications controller prior to transmitting data packets to the communications controller, said communications controller for reducing transmission delays when lost, corrupted or otherwise unintelligible data packet transmissions are received comprising:

means for identifying lost, corrupted or otherwise unintelligible data within said data packet transmissions;

means, coupled to the identifying means, for determining whether communication resources are available to support retransmission of the lost, corrupted or otherwise unintelligible data; and means for transmitting a single response to the remote unit that identifies the lost, corrupted or otherwise unintelligible data and grants communication resources to the remote unit for retransmission of the lost, corrupted or otherwise unintelligible data.

16. The system of claim 15 wherein communication resources comprise frequency spectrum and TDMA time slots.

17. In a TDMA packet transmission system wherein a plurality of remote units request communication resources from a controller by transmitting multiple requests to said controller, a method for reducing transmission delays within said system comprising the steps of:

the remote unit:

transmitting access requests to the controller requesting resources to facilitate transmission of data packets to the communications;

storing the requests sequentially in memory;

awaiting a resource grant from the controller;

applying the resource grant received from the controller to the oldest access request stored in memory in order to transmit a data packet to the controller;

awaiting a response from the controller indicating a need to retransmit at least some of the data; and upon receipt of said response, refraining from transmitting a retransmit request to the controller requesting additional communication resources;

at the controller:

receiving the transmitted data packet;

identifying missing data from within the data packet transmission;

determining whether communication resources are available to support retransmission of the missing data; and if so, transmitting a single response to the requesting device identifying the missing data and simultaneously granting sufficient resources for retransmission of the missing data.

* * * * *